(12) United States Patent
Lee et al.

(10) Patent No.: US 11,942,692 B2
(45) Date of Patent: Mar. 26, 2024

(54) IN-BAND FULL DUPLEX MIMO ANTENNA AND TRANSCEIVER USING THE ANTENNA

(71) Applicant: CHUNG ANG UNIVERSITY INDUSTRY ACADEMIC COOPERATION FOUNDATION, Seoul (KR)

(72) Inventors: Han Lim Lee, Seoul (KR); Min Gyu Kim, Seoul (KR); Ji Ho Lee, Seoul (KR); Jin Woo Kim, Seoul (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 257 days.

(21) Appl. No.: 17/406,770

(22) Filed: Aug. 19, 2021

(65) Prior Publication Data
US 2022/0181792 A1    Jun. 9, 2022

(30) Foreign Application Priority Data
Dec. 8, 2020  (KR) .................. 10-2020-0170775

(51) Int. Cl.
*H04B 7/04* (2017.01)
*H01Q 21/24* (2006.01)
(Continued)

(52) U.S. Cl.
CPC .......... *H01Q 21/24* (2013.01); *H04B 7/0413* (2013.01); *H04L 5/14* (2013.01)

(58) Field of Classification Search
CPC .. H04B 7/0413; H04B 7/0426; H04B 7/0452; H04B 1/54; H04L 5/0023; H04L 5/14;
(Continued)

(56) References Cited

U.S. PATENT DOCUMENTS 8,749,441 B2 *  6/2014  Fenn ............... H01Q 1/525
                                                     343/793
9,391,375 B1 *  7/2016  Bales .............. H01Q 21/064
(Continued)

FOREIGN PATENT DOCUMENTS

| KR | 20080097080 A | 11/2008 |
| KR | 20090022583 A | 3/2009 |
| KR | 20100070555 A | 6/2010 |

OTHER PUBLICATIONS

Wu et al., A Compact, Monostatic, Co-Circularly Polarized Simultaneous Transmit and Receive (STAR) Antenna With High Isolation, IEEE, 5 pages, Jul. 2020.*
(Continued)

*Primary Examiner* — Frank Duong
(74) *Attorney, Agent, or Firm* — Bridgeway IP Law Group, PLLC; Jihun Kim (57) ABSTRACT

Provided is an in-band full-duplex MIMO antenna, which includes: a substrate; and transmission antenna elements and reception antenna elements separately coaxially disposed on the same plane of the substrate, in which the transmission antenna elements have a first polarization characteristic, and the reception antenna elements have a second polarization characteristic different from the first polarization characteristic.

6 Claims, 8 Drawing Sheets

(51) Int. Cl.
*H04B 7/0413* (2017.01)
*H04L 5/14* (2006.01)

(58) Field of Classification Search
CPC ........ H04L 5/1461; H01Q 21/24; H01Q 1/38; H01Q 1/521; H01Q 21/065; H01Q 21/28
See application file for complete search history.

(56) References Cited

U.S. PATENT DOCUMENTS

| 11,088,463 | B1* | 8/2021 | Milroy | H01Q 21/245 |
| 2014/0253378 | A1* | 9/2014 | Hinman | H01Q 21/28 |
| | | | | 342/361 |
| 2017/0366208 | A1* | 12/2017 | Filipovic | H01Q 9/32 |
| 2022/0302603 | A1* | 9/2022 | Chieh | H01Q 21/0075 |

OTHER PUBLICATIONS

Nawaz et al., Single Layer, Differentially Driven, LHCP Antenna With Improved Isolation for Full Duplex Wireless Applications, IEEE, 11 pages, Nov. 21, 2019.*

Etellisi et al., Wideband Monostatic Co-Polarized Co-Channel Simultaneous Transmit and Receive Broadside Circular Array Antenna, IEEE, 10 pages, Feb. 2019.*

Ha et al., Monostatic Co-Polarized Full-Duplex Antenna With Left- or Right-Hand Circular Polarization, IEEE, 9 pages, Oct. 2017.*

* cited by examiner

IN-BAND FULL DUPLEX MIMO ANTENNA AND TRANSCEIVER USING THE ANTENNA

CROSS-REFERENCE TO RELATED APPLICATIONS

This application claims the priority of Korean Patent Application No. 10-2020-0170775 filed on Dec. 8, 2020, in the Korean Intellectual Property Office, the disclosure of which is incorporated herein by reference.

BACKGROUND

Field

The present disclosure relates to an in-band full-duplex Multiple-Input and Multiple-Output (MIMO) antenna and a transceiver including the in-band full-duplex MIMO antenna and, more particularly, to an in-band full-duplex MIMO antenna that transmits and receives signals with high isolation in the same frequency band, and a transceiver including the in-band full-duplex MIMO antenna.

Description of the Related Art

Since in-band full-duplex (FDX) communication can simultaneously transmit and receive information using the same frequency, the frequency efficiency is higher than that of the half-duplex (HDX) communication. Accordingly, the in-band full-duplex communication can be effectively used for the next-generation communication technology that requires high-speed data transmission. Further, the in-band full-duplex communication is generally used for radars that are required to transmit and receive signals in real time.

However, since transmission and reception are simultaneously performed using the same frequency, high isolation is required between a transmitter and a receiver.

In general, it is possible to increase the physical distance separately using a transmission antenna and a reception antenna, or an additional circuit can be used to increase isolation when a single transceiver antenna is used.

When transmission and reception antennas are separated, there is a defect that isolation is increased but the physical size is increased, and a transceiver module is difficult to unify. However, when a single transceiver antenna is used, there is an advantage that the physical size can be decreased and a single transceiver antenna can be easily modularized with a transceiver chip, but there is a defect that the isolation between the transmitter and the receiver is decreased.

SUMMARY

Therefore, an object of the present disclosure is to provide an in-band full-duplex MIMO antenna that transmits and receives signals with high isolation in the same frequency band without help of a special isolator, and a transceiver using the in-band full-duplex MIMO antenna.

The object(s) of the present disclosure is not limited to those described above and (an)other objects may be made apparent to those skilled in the art from the following description.

In order to achieve the objects, an in-band full-duplex MIMO antenna according to an embodiment of the present disclosure includes: a substrate; and transmission antenna elements and reception antenna elements separately coaxially disposed on the same plane of the substrate, in which the transmission antenna elements may have a first polarization characteristic and the reception antenna elements may have a second polarization characteristic different from the first polarization characteristic.

In an embodiment, the first polarization characteristic corresponds to any one polarization of right-handed circular polarization (RHCP) and left-handed circular polarization (LHCP), and the second polarization characteristic corresponds to the other polarization except for any one polarization corresponding to the first polarization characteristic.

In an embodiment, the number of antenna elements disposed inside the coaxial structure may be smaller than or the same as the number of antenna elements disposed outside.

In an embodiment, the antenna elements disposed outside the coaxial structure may include two pairs of antenna elements diagonally symmetric to each other.

In an embodiment, the antenna elements disposed inside the coaxial structure may include two pairs of antenna elements vertically and horizontally symmetric to each other.

In an embodiment, the transmission antenna elements and the reception antenna elements may have a power supply hole for supplying power.

A transceiver according to an embodiment of the present disclosure may include: a MIMO antenna including a substrate, and transmission antenna elements and reception antenna elements separately coaxially disposed on the same plane of the substrate; an RF switch for changing polarization of each polarization characteristic of the MIMO antenna; and a distributor distributing power of the transmission antenna elements and the reception antenna elements such that a phase of a signal transmitted from the MIMO antenna is controlled.

In an embodiment, the RF switch may be a single double-pole-double-throw (DPDT) switch or may be composed of several single-pole-double-throw (SPDT) switches.

According to the present disclosure, since individual antenna elements having opposite polarizations are coaxially disposed and then, if necessary, signals are transmitted and received using a DPDT switch, high isolation is satisfied and modularization into a single antenna is possible, so there is an effect that it is easy to expand to a desired array size.

The effects of the present disclosure are not limited to those described above and other effects may be made apparent to those skilled in the art from claims.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

The present disclosure may be modified in various ways and implemented by various exemplary embodiments, so that specific exemplary embodiments are shown in the drawings and will be described in detail herein. However, it is to be understood that the present disclosure is not limited to the specific exemplary embodiments, but includes all modifications, equivalents, and substitutions included in the spirit and the scope of the present disclosure. Similar reference numerals are assigned to similar components in the following description of drawings.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element intervening therebetween.

Terms used in the present specification are used only to describe specific exemplary embodiments rather than limiting the present disclosure. Singular forms are intended to include plural forms unless the context clearly indicates otherwise. It will be further understood that the terms "comprises" or "have" used in this specification, specify the presence of stated features, numerals, steps, operations, components, parts, or a combination thereof, but do not preclude the presence or addition of one or more other features, numerals, steps, operations, components, parts, or a combination thereof.

Unless defined otherwise, it is to be understood that all the terms used in the specification including technical and scientific terms have the same meaning as those that are understood by those who are skilled in the art. It will be further understood that terms such as terms defined in common dictionaries should be interpreted as having a meaning that is consistent with their meaning in the context of this specification and the relevant art and will not be interpreted in an idealized or overly formal sense unless expressly so defined herein.

Hereinafter, preferred embodiments of the present disclosure will be described in detail with reference to the accompanying drawings.

Figure 1:
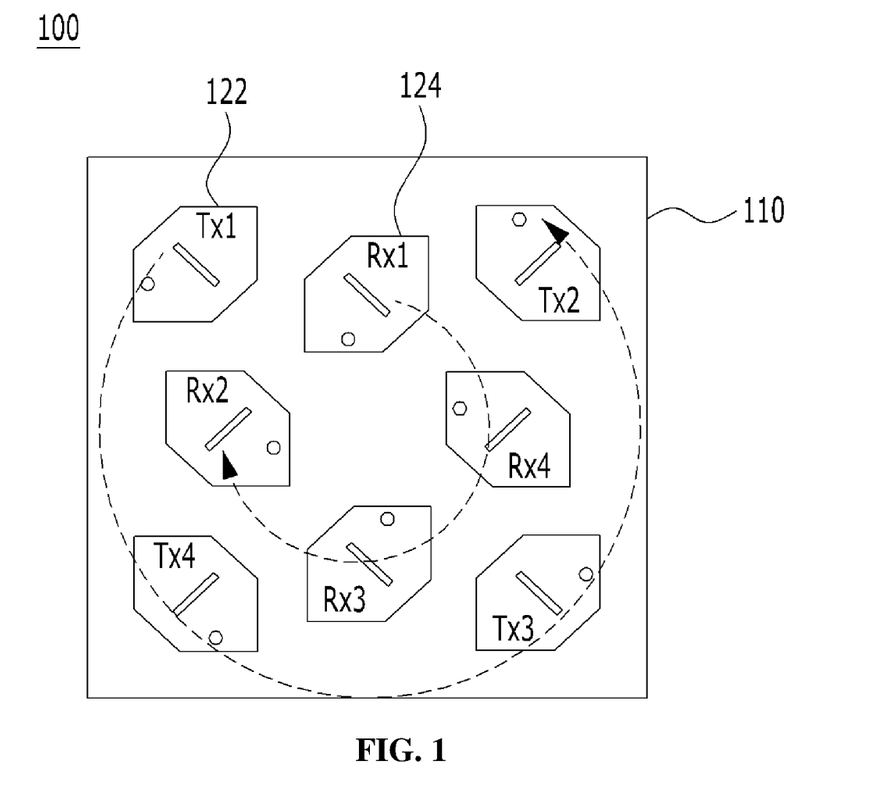
FIG. 1 is a plan view showing a MIMO antenna according to an embodiment of the present disclosure.
Figure 2:
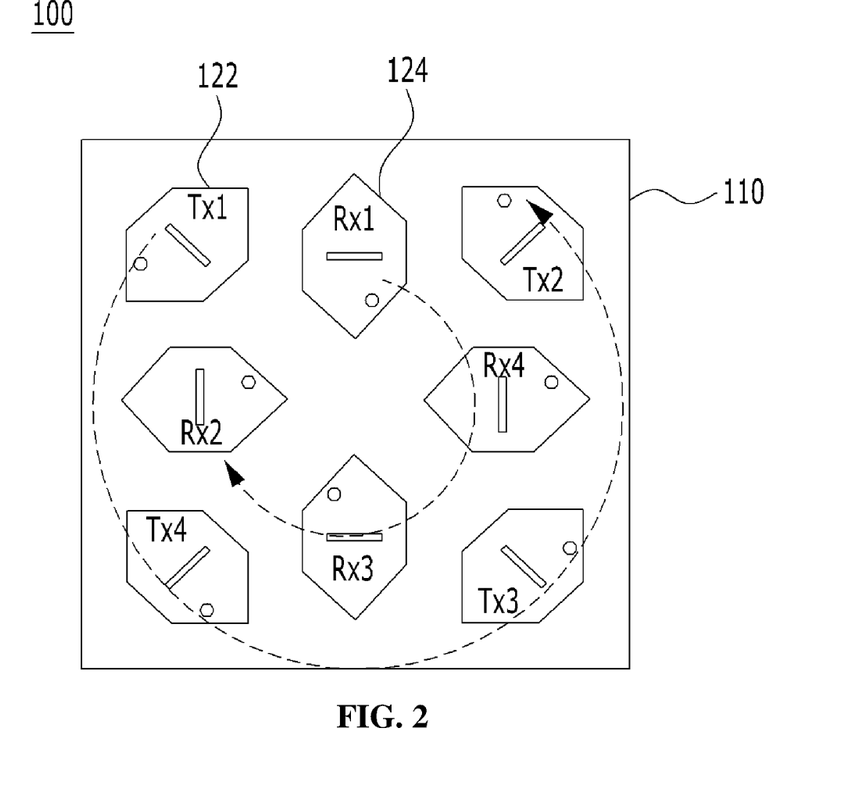
FIG. 2 is a plan view showing a MIMO antenna according to another embodiment of the present disclosure.
Figure 3:
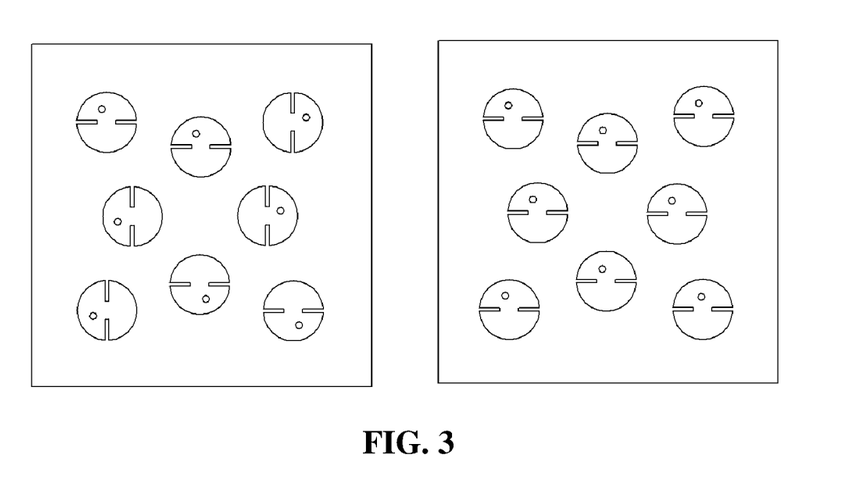
FIG. 3 is a plan view showing a MIMO antenna according to still another embodiment of the present disclosure.
Figure 4:
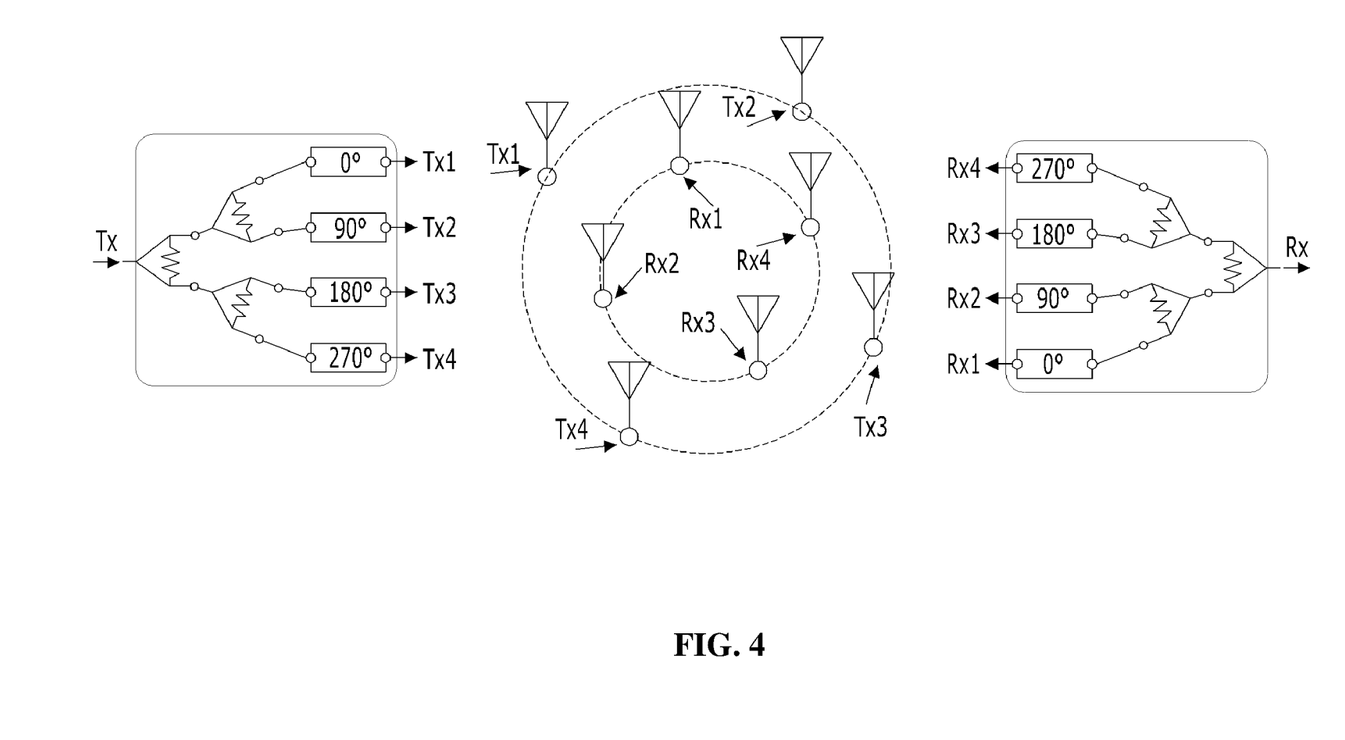
FIG. 4 is a plan view showing a power supplier according to an embodiment of the present disclosure.
Figure 5A:
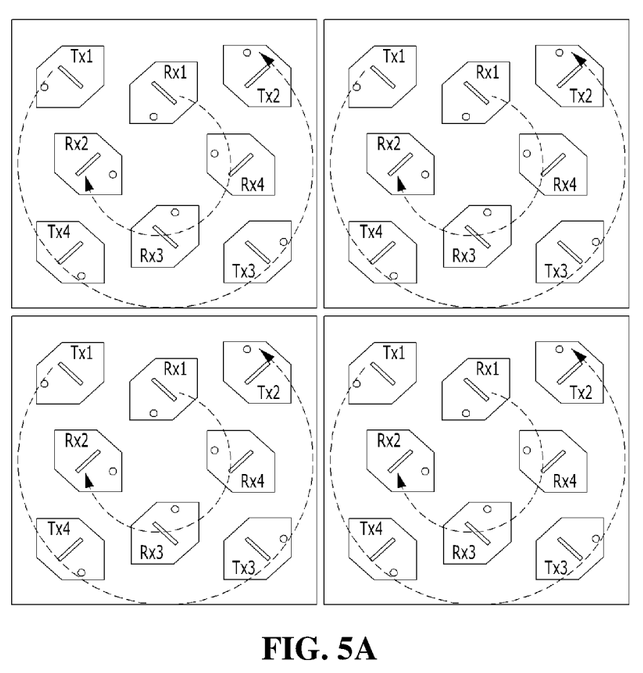
FIG. 5A to 5C are conceptual views showing an array of a MIMO antenna according to an embodiment of the present disclosure.
Figure 5B:
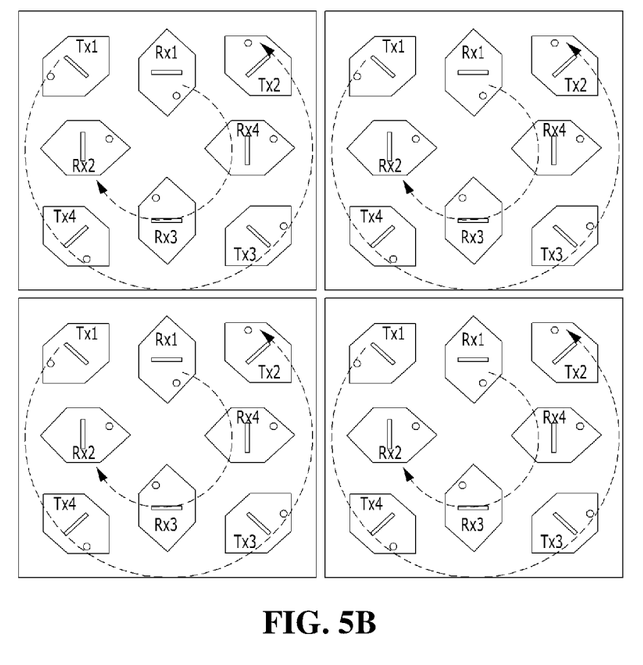
Figure 5C:
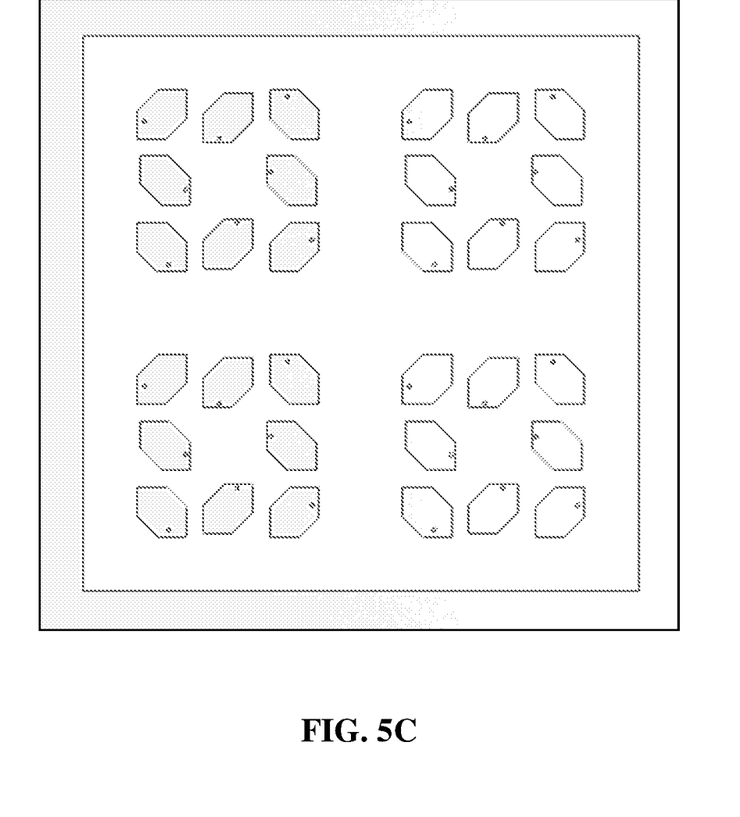
Figure 6:
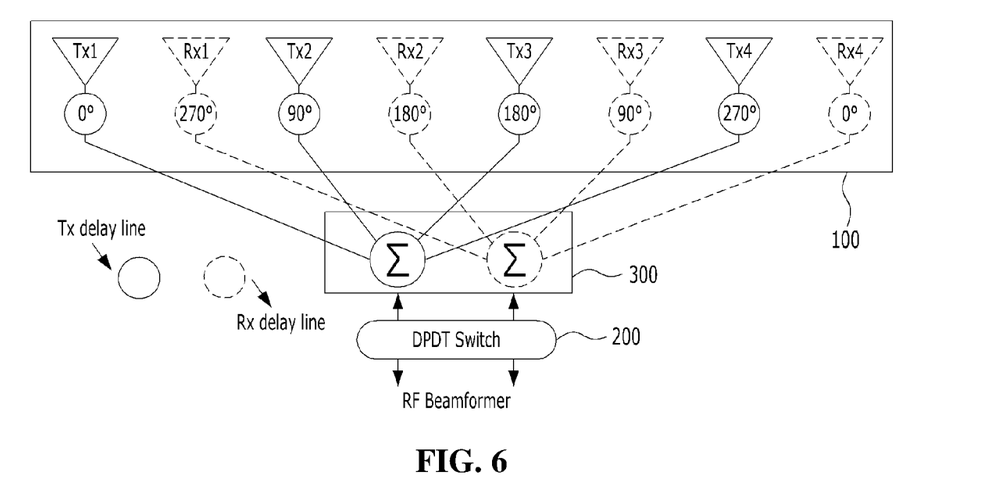
FIG. 6 is a conceptual view showing a transceiver according to an embodiment of the present disclosure.

FIG. 1 is a plan view showing a MIMO antenna according to an embodiment of the present disclosure, FIG. 2 is a plan view showing a MIMO antenna according to another embodiment of the present disclosure, FIG. 3 is a plan view showing a MIMO antenna according to still another embodiment of the present disclosure, FIG. 4 is a plan view showing a power supplier according to an embodiment of the present disclosure, FIG. 5 is a conceptual view showing an array of a MIMO antenna according to an embodiment of the present disclosure, and FIG. 6 is a conceptual view showing a transceiver according to an embodiment of the present disclosure.

Referring to FIG. 1, a MIMO antenna 100 according to an embodiment of the present disclosure, which is an antenna for simultaneously transmitting and receiving information using a frequency in the same band, may include a substrate 110 and transmission and reception antenna elements 122 and 124.

The substrate 110 is a dielectric substrate 110 made of a dielectric element in a flat plate structure, and the permittivity, length, width, and thickness may be differently set in accordance with setting by a user.

The material of the dielectric substrate 110 may include all of materials of a dielectric substrate 110 that are generally used in this field such as epoxy, Duroid, Teflon, bakelite, high-resistance silicon, glass, alumina, LTCC, and air foam.

According to an embodiment, the substrate 110 is exemplified as a square, but the shape and size of the substrate 110 are not limited thereto and the substrate 110 may be formed in various shapes such as a circle, a rectangle, and a polygon.

In the substrate 110, transmission and reception antenna elements 122 and 124 may be disposed on a first plane and a grounding plate (not shown) may be disposed on a second plane. The first plane and the second plane are the top or the bottom of the substrate 110.

The transmission and reception antenna elements 122 and 124 include transmission antenna elements 122 and reception antenna elements 124 and may be separately coaxially disposed on the same plane of the substrate 110. The plane in this case is the top that is the first plane of the substrate 110.

That is, the transmission antenna element 122 and the reception antenna element 124 are used as a single module type antenna, the transmission and reception antenna elements 122 and 124 are integrated within one substrate 110 and the interference therebetween should be minimized. Accordingly, in the present embodiment, the transmission antenna elements 122 and the reception antenna elements 124 were coaxially disposed to be physically separated and reduce influence between transmission and reception signals.

The transmission antenna elements 122 may be disposed outside from the center of the coaxial structure and the reception antenna elements 124 may be disposed inside, but, depending on use, the reception antenna elements 124 may be disposed outside and the transmission antenna elements 122 may be disposed inside. For the convenience of description of the present disclosure, an embodiment in which the transmission antenna elements 122 are disposed outside the coaxial structure and the reception antenna elements 124 are disposed inside is described.

The transmission antenna elements 122 may have a first polarization characteristic and the reception antenna elements 124 may have a second polarization characteristic different from the first polarization characteristic. That is, the antenna elements each have opposite polarization characteristics.

Polarization of antennas is classified into circular polarization (CP) and linear polarization (LP) in a broad meaning, the circular polarization is classified into right-handed circular polarization (RHCP) and left-handed circular polarization (LHCP), and the linear polarization is classified into vertical polarization (VP) and horizontal polarization (HP).

The antenna elements 122 and 124 of the present embodiment may have a first polarization characteristic and a second polarization characteristic of the circular polarization. In detail, the first polarization characteristic may correspond to any one polarization of right-handed circular polarization (RHCP) and left-handed circular polarization (LHCP), and the second polarization characteristic may correspond to the other polarization except for any one polarization corresponding to the first polarization characteristic.

For example, referring to FIGS. 1 and 2, the transmission antenna elements 122 disposed outside the coaxial structure may have an RHCP characteristic and the reception antenna elements 124 disposed inside the coaxial structure may have an LHCP characteristic. For reference, the polarization characteristics are not limited to circular polarization and may have a linear polarization characteristic.

The number of the antenna elements disposed inside the coaxial structure may be the same as or smaller than the number of the antenna elements disposed outside, and in the present embodiments, the antenna elements are each provided as four pieces.

The antenna elements disposed outside the coaxial structure may include two pairs of antenna elements diagonally symmetric to each other.

In detail, when the transmission antenna elements 122 are disposed outside the coaxial structure, the transmission antenna elements 122 may be disposed close to corners, respectively, and elements diagonally facing each other may be symmetric. For example, a pair of transmission antenna elements Tx2 and Tx4 disposed in the first quadrant and the third quadrant of the substrate 110 may be inclined left and symmetric to each other, and another pair of transmission antenna elements Tx1 and Tx3 disposed in the second quadrant and the fourth quadrant of the substrate 110 may be inclined right and symmetric to each other.

The antenna elements disposed inside the coaxial structure may include two pairs of antenna elements vertically and horizontally symmetric to each other.

In detail, when the reception antenna elements 124 are disposed inside the coaxial structure, the reception antenna elements 124 may entirely make a cross shape and may be disposed between the transmission antenna elements 122, and the reception antenna elements 124 facing each other in a straight line may be symmetric.

As an embodiment, as shown in FIG. 1, a pair of reception antenna elements Rx1 and Rx3 disposed at the upper portion and the lower portion on the substrate 110 may be inclined right and symmetric to each other, and another pair of reception antenna elements Rx2 and Rx4 disposed at the left portion and the right portion on the substrate 110 may be inclined left and symmetric to each other.

As another embodiment, as shown in FIG. 2, a pair of reception antenna elements Rx1 and Rx3 disposed at the upper portion and the lower portion on the substrate 110 may be straight up and down and symmetric to each other, and another pair of reception antenna elements Rx2 and Rx4 disposed at the left portion and the right portion on the substrate 110 may be straight left and right and symmetric to each other.

The transmission antenna elements 122 and the reception antenna elements 124 are each formed in a hexagonal shape in the embodiments shown in FIGS. 1 and 2, but they are not limited thereto and may be formed in a circular shape or other various shapes, as shown in FIG. 3.

The transmission antenna element 122 and the reception antenna element 124 may have a power supply hole (not shown) for supplying power.

As shown in FIG. 4, the power supply hole is a region formed through the substrate 110 to receive a power line for supplying power to the transmission and reception antenna elements 122 and 124, and in this case, the power supply hole may receive the internal conductor of a coaxial cable.

Referring to FIG. 5A to 5C, the MIMO antenna of the present disclosure may have an array structure composed of several modules by expanding a single module type antenna. The number, shape, and polarization characteristic of the antenna elements constituting the antenna of each module may be varied.

Referring to FIG. 6, a transceiver according to an embodiment of the present disclosure may include a MIMO antenna 100, an RF switch 200, and a distributor 300.

The MIMO antenna 100 is a single module type antenna composed of the transmission and reception antenna elements 122 and 124 and the relevant detailed description is as the above.

The RF switch 200, which is a component for changing the polarization of polarization characteristics of the MIMO antenna, may be connected to an end of the power supplier. That is, the RF switch 200 may change the different polarization characteristics of the transmission and reception antenna elements 122 and 124 to transmit and receive signals.

For example, when the transmission antenna element 122 has an RHCP characteristic and the reception antenna element 124 has an LHCP characteristic, the RF switch 200 may switch a reception signal having an RHCP characteristic to an LHCP characteristic and switch a transmission signal having an RHCP characteristic to an LHCP characteristic.

The RF switch 200 of the present embodiment may be a single double-pole-double-throw (DPDT) switch or may be composed of several single-pole-double-throw (SPDT) switches. That is, the RF switch 200 may be one DPDT switch or may be composed of several SPDT switches that can be operated as a DPDT switch.

The distributor 300 may distribute power of the transmission antenna element 122 and the reception antenna element 124 such that the phase of a signal transmitted from the MIMO antenna 100 is controlled.

For example, referring to FIGS. 1 and 2, it is possible to distribute power to respective antenna elements such that the phases of Tx1, Tx2, Tx3, and Tx4 that are the transmission antenna elements 122 are controlled to 0°, 90°, 180°, and 270°, respectively, and the phases of Rx1, Rx2, Rx3, and Rx4 that are reception antenna elements 124 are controlled to 0°, 90°, 180°, and 270°, respectively. Accordingly, the transmission and reception antenna elements 122 and 124 may have different polarization characteristics. For reference, the distributor 300 may be replaced with a delay line for transmission and reception signals in the present disclosure.

The transceiver of the present disclosure may further include a beamformer (not shown) that forms a beam pattern in a specific direction, depending on the phases controlled as described above.

Figure 7A:
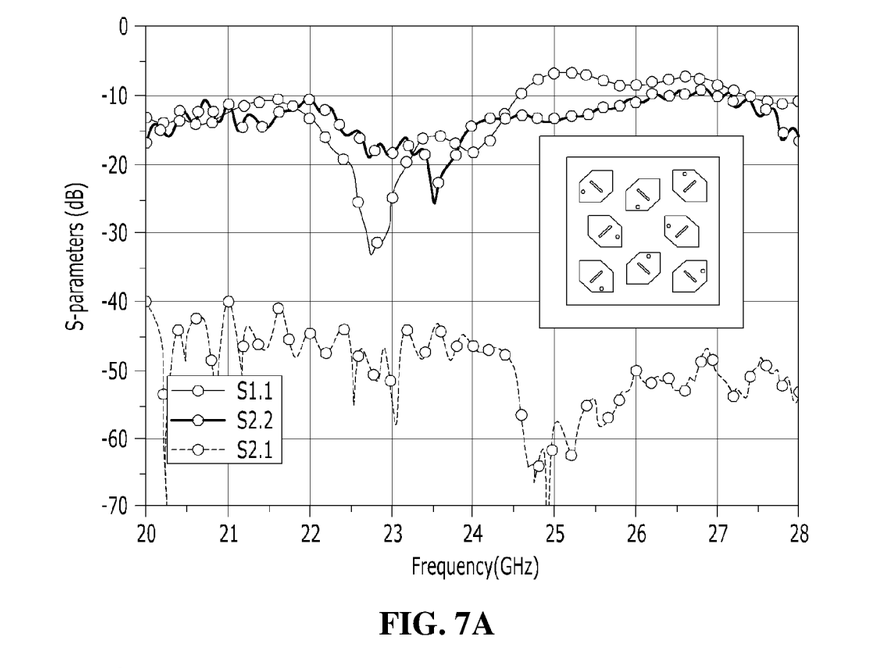
FIG. 7A is a graph showing a reflection characteristic according to an embodiment of the present disclosure.
Figure 7B:
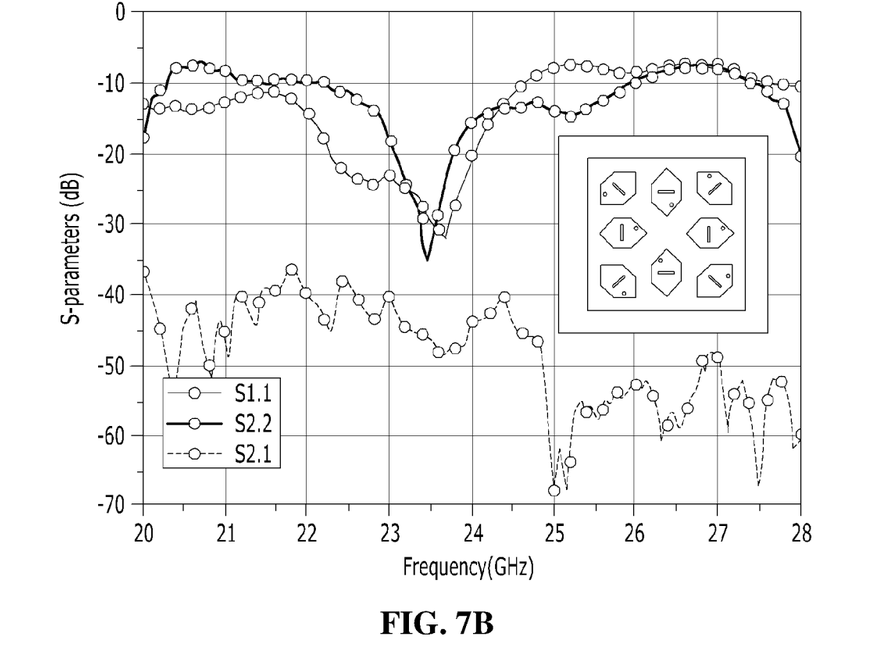
FIG. 7B is a graph showing a reflection characteristic according to another embodiment of the present disclosure.

FIG. 7A is a graph showing a reflection characteristic according to an embodiment of the present disclosure and FIG. 7B is a graph showing a reflection characteristic according to another embodiment of the present disclosure.

In order to examine a reflection characteristic, the transmission and reception antenna elements were designed on a substrate having a size of $1.47\lambda_0$(19 mm)×$1.47\lambda_0$(19 mm) to have a central frequency of 24 GHz in the present disclosure.

Referring to FIGS. 7A and 7B, the port 1 (black) of the S-parameter shows the reflection characteristic of the transmission antenna elements and the port 2 (red) of the S-parameter shows the reflection characteristic of the reception antenna elements. As shown in the graphs, it can be seen that impedance matching between transmission and reception antenna elements was good and that the isolation between transmission and reception signal was high (S2.1) in the operation band.

Figure 8A:
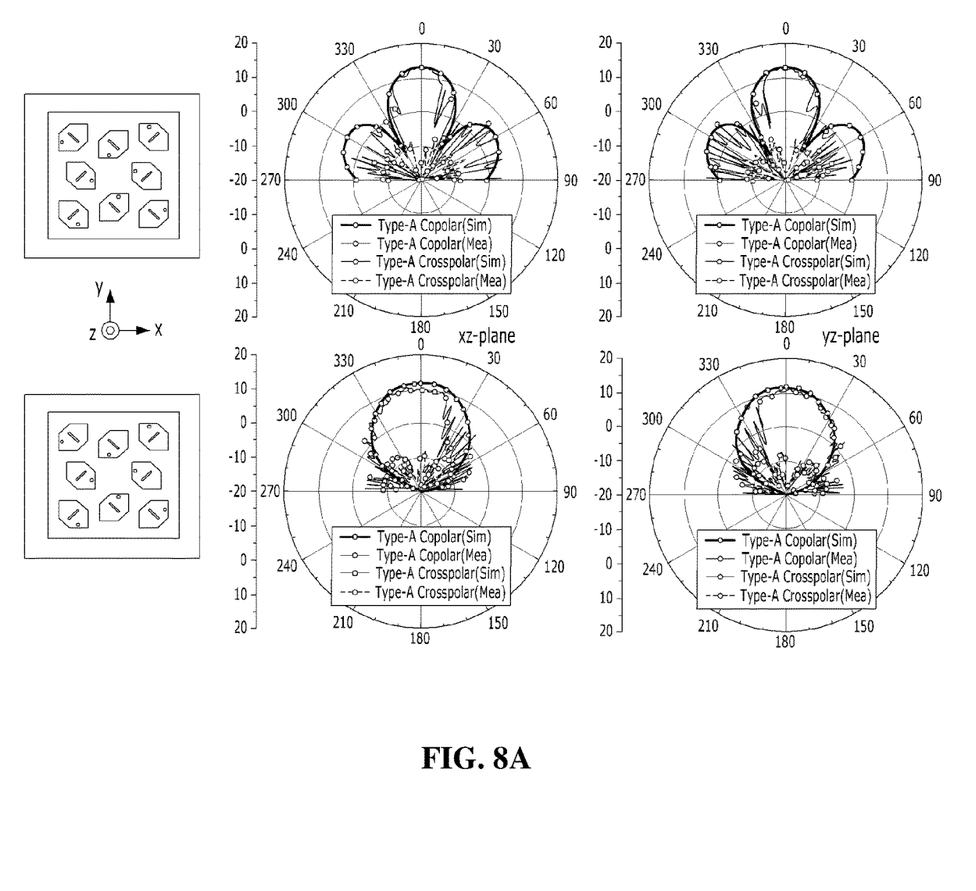
FIG. 8A is a graph comparing the results of simulating radiation characteristics on an xz-plane and a yz-plane according to an embodiment of the present disclosure.
Figure 8B:
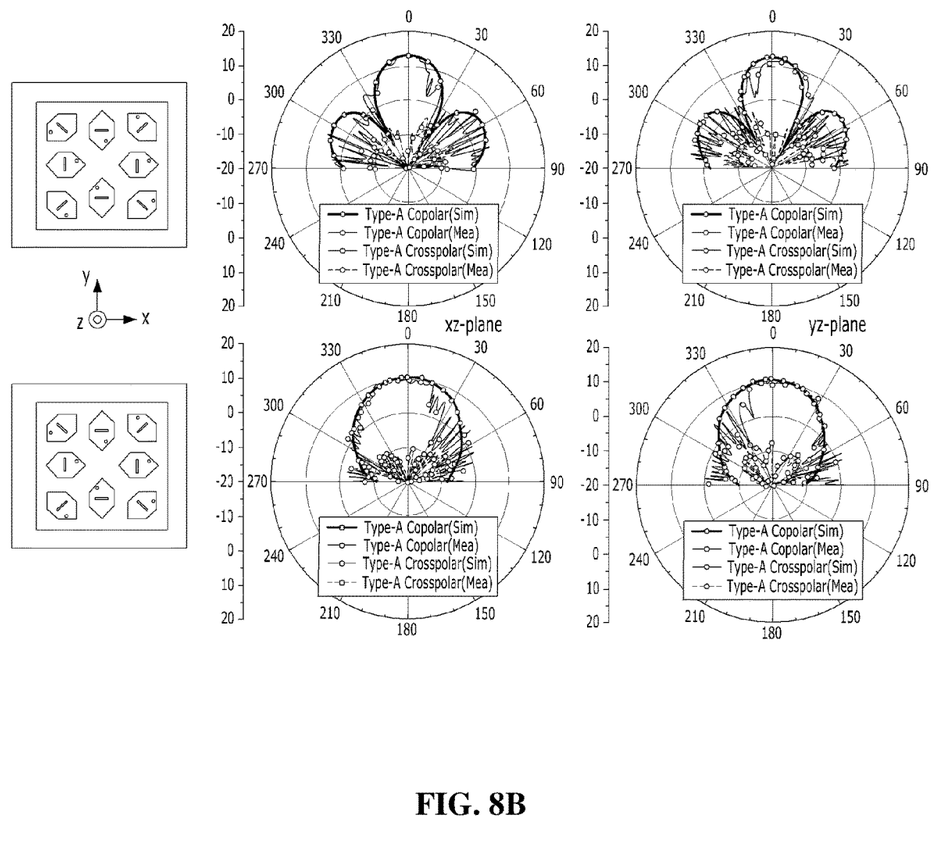
FIG. 8B is a graph comparing the results of simulating radiation characteristics on an xz-plane and a yz-plane according to another embodiment of the present disclosure.

FIG. 8A is a graph comparing the results of simulating radiation characteristics on an xz-plane and a yz-plane according to an embodiment of the present disclosure and FIG. 8B is a graph comparing the results of simulating radiation characteristics on an xz-plane and a yz-plane according to another embodiment of the present disclosure.

The parameters of the MIMO antenna used to compare radiation characteristics are the same as the parameters of the MIMO antenna used to examine the reflection characteristic described above.

Referring to FIGS. 8A and 8B, it was found that half power beamwidths (HPBW) 25 degrees or more and gains 11.5 dBi or more were obtained from transmission antenna elements and HPBWs 43 degrees or more and gains 9.2 dBi or more were obtained from reception antenna elements in both of the MIMO antennas according to an embodiment and another embodiment of the present disclosure.

Therefore, according to the present disclosure, since individual antenna elements having opposite polarizations are coaxially disposed and then, if necessary, signals are transmitted and received using a DPDT switch, high isolation is satisfied and modularization into a single antenna is possible, so there is an effect that it is easy to expand to a desired array size.

The above description merely explains the spirit of the present disclosure and the present disclosure may be changed and modified in various ways without departing from the spirit of the present disclosure by those skilled in the art. Accordingly, the embodiments described herein are provided merely not to limit, but to explain the spirit of the present disclosure, and the spirit of the present disclosure is not limited by the embodiments. The protective range of the present disclosure should be construed by the following claims and the scope and spirit of the present disclosure should be construed as being included in the patent right of the present disclosure.

What is claimed is:

1. An in-band full-duplex Multiple-Input and Multiple-Output (MIMO) antenna comprising:
   a substrate; and
   transmission antenna elements and reception antenna elements separately coaxially disposed on a same plane of the substrate,
   wherein the transmission antenna elements have a first polarization characteristic, and the reception antenna elements have a second polarization characteristic different from the first polarization characteristic,
   wherein among antenna elements disposed outside a coaxial structure, a pair of antenna elements disposed in a first quadrant and a third quadrant of the substrate are inclined left and symmetric to each other and another pair of antenna elements disposed in a second quadrant and a fourth quadrant of the substrate are inclined right and symmetric to each other, and
   wherein among antenna elements disposed inside the coaxial structure, a pair of antenna elements disposed at an upper portion and a lower portion on the substrate are inclined right and symmetric to each other and another pair of antenna elements disposed at a left portion and a right portion on the substrate are inclined left and symmetric to each other.

2. The in-band full-duplex MIMO antenna of claim 1, wherein the first polarization characteristic corresponds to any one polarization of right-handed circular polarization (RHCP) and left-handed circular polarization (LHCP), and the second polarization characteristic corresponds to the other polarization except for any one polarization corresponding to the first polarization characteristic.

3. The in-band full-duplex MIMO antenna of claim 1, wherein the number of antenna elements disposed inside the coaxial structure is smaller than or the same as the number of antenna elements disposed outside.

4. The in-band full-duplex MIMO antenna of claim 1, wherein the transmission antenna elements and the reception antenna elements have a power supply hole for supplying power.

5. A transceiver comprising:
   A Multiple-Input and Multiple-Output (MIMO) antenna including a substrate, and transmission antenna elements and reception antenna elements separately coaxially disposed on the same plane of the substrate;
   an RF switch for changing polarization of each polarization characteristic of the MIMO antenna; and
   a distributor for distributing power of the transmission antenna elements and the reception antenna elements such that a phase of a signal transmitted from the MIMO antenna is controlled,
   wherein among antenna elements disposed outside a coaxial structure of the MIMO antenna, a pair of transmission antenna elements disposed in a first quadrant and a third quadrant of the substrate are inclined left and symmetric to each other and another pair of transmission antenna elements disposed in a second quadrant and a fourth quadrant of the substrate are inclined right and symmetric to each other, and
   wherein among antenna elements disposed inside the coaxial structure of the MIMO antenna, a pair of reception antenna elements disposed at an upper portion and a lower portion on the substrate are inclined right and symmetric to each other and another pair of reception antenna elements disposed at a left portion and a right portion on the substrate are inclined left and symmetric to each other.

6. The transceiver of claim 5, wherein the RF switch is a single double-pole-double-throw (DPDT) switch or is composed of several single-pole-double-throw (SPDT) switches.

* * * * *